United States Patent [19]

Matsushita et al.

[11] Patent Number: 4,556,891

[45] Date of Patent: Dec. 3, 1985

[54] PRINTING APPARATUS AND METHOD

[75] Inventors: Yoshikazu Matsushita; Masaki Takei; Masatoshi Yonekubo; Tsutomu Nishiwaki, all of Suwa, Japan

[73] Assignee: Kabushiki Kaisha Suwa Seikosha, Tokyo, Japan

[21] Appl. No.: 590,087

[22] Filed: Mar. 16, 1984

[30] Foreign Application Priority Data

Mar. 18, 1983 [JP] Japan .................................. 58-45588
Jan. 25, 1984 [JP] Japan .................................. 59-11368

[51] Int. Cl.$^{4}$ .............................................. G01D 15/10
[52] U.S. Cl. ................................ 346/76 PH; 346/1.1
[58] Field of Search ...................... 346/1, 76 R, 76 PH

[56] References Cited

U.S. PATENT DOCUMENTS

| | | | |
|---|---|---|---|
| 3,719,261 | 3/1973 | Heinzer et al. | 346/76 PH X |
| 3,744,611 | 7/1973 | Montanaii et al. | 346/76 PH X |
| 3,951,757 | 4/1976 | Yoshino et al. | 346/76 R X |
| 4,215,355 | 7/1980 | Moore | 346/155 |
| 4,305,082 | 12/1981 | Kusakawa et al. | 346/76 R X |
| 4,309,117 | 1/1982 | Chang et al. | 346/76 PH X |
| 4,410,898 | 10/1983 | Murayama et al. | 346/76 PH |
| 4,484,200 | 11/1984 | Tabata et al. | 346/76 PH |
| 4,505,603 | 3/1985 | Yana | 346/76 PH X |

FOREIGN PATENT DOCUMENTS

| | | | |
|---|---|---|---|
| 57-8186 | 1/1982 | Japan | 346/76 PH |

*Primary Examiner*—George H. Miller, Jr.
*Attorney, Agent, or Firm*—Blum Kaplan Friedman Silberman & Beran

[57] ABSTRACT

A printing apparatus and method for printing on a record medium utilizing an electric thermo-transfer process. The apparatus includes an ink sheet having an ink layer with heat-fusable ink thereon facing the record medium, and a resistive layer. A print head having at least a pair of opposed electrodes is in contact with the resistive layer. A driving circuit is coupled to the pair of opposed electrodes for applying a voltage to the pair of opposed electrodes. The applied voltage causes a current to flow in the ink sheet to heat the ink layer. A pulse width setting circuit controls the pulse width of the voltage applied to the electrodes to control the position and amount of heating of the ink. The system provides full-color printing on the record medium.

20 Claims, 31 Drawing Figures

FIG. 6A
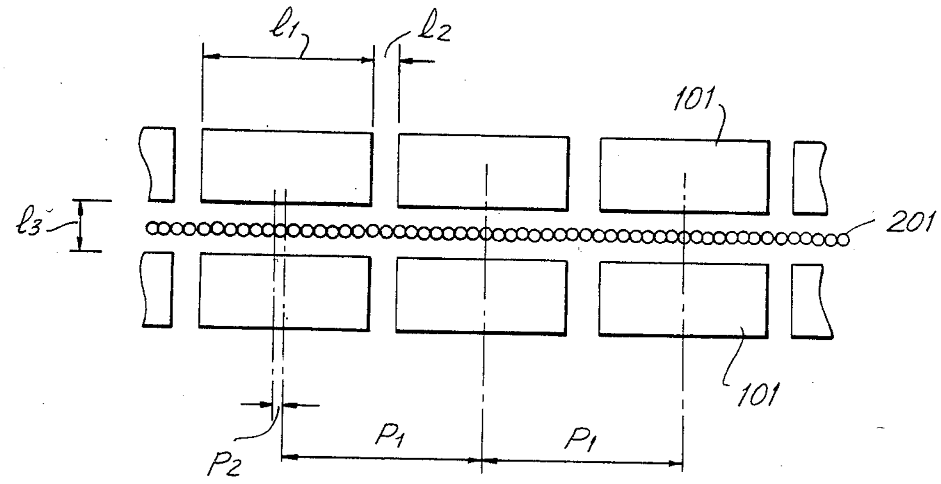
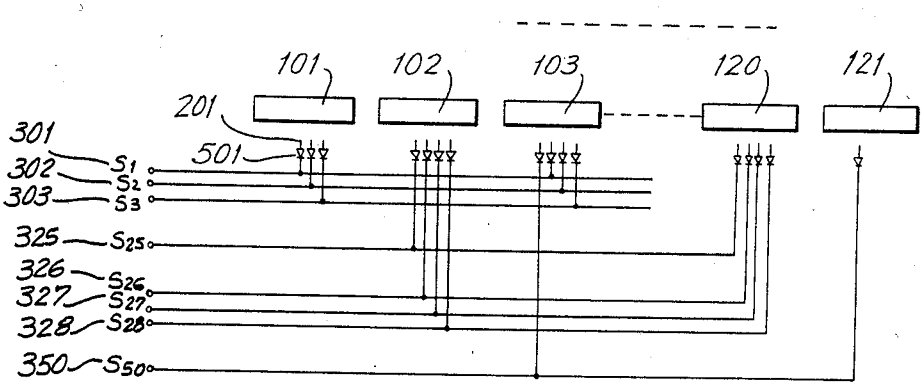
FIG. 6B

PRINTING APPARATUS AND METHOD

BACKGROUND OF THE INVENTION

The present invention relates generally to a full-color printing apparatus which is capable of forming a gray scale and, in particular, to a driving circuit for an electric thermo transfer apparatus wherein printing is effected on a recording medium by melting heat-fusable ink with the joules heat generated by the current flowing through a conductive sheet.

Various types of color hard copy apparatus have recently been proposed. Such color printing apparatus mainly utilize an ink jet method or a thermal transfer method which uses a thermal head. In both methods, the darkness or intensity of the printed image is determined by a quasi-area modulation such as dither matrix, for obtaining a full-color image. This is because the area of one dot is modulated stably only due to the presence of the color picture element. Thus, in order to maintain a resolution of the picture element to a certain extent, a recording head having extremely high density is needed, or a high density recording is required.

For example, when a (4×4) matrix is formed for representing 16 gray scale at 5 dot/mm of the density of the picture element, 20 dot/mm of resolution is necessary in the line head, while in the single head, the speed is reduced to onesixteenth of the case of printing only two levels. Accordingly, the thermal transfer method of the prior art is highly expensive and its speed is extremely slow.

U.S. Pat. No. 4,350,449 discloses a printing apparatus using the electric thermo transfer method as depicted in FIG. 24 of the present application. Referring to FIG. 24 of the present application, an ink sheet consists of a resistive layer 251, a conductive layer 252 and an ink layer 254 which faces a record medium 255. Therein, a printing electrode 256 and a return electrode 257 are in contact with the resistive layer 251 and a voltage is applied therebetween. As the current flows through resistive layer 251 and conductive layer 252, the joules heat is generated in a portion 251*a* of resistive ayer 251. This joules heat causes melting of the thermally transferable material in the contiguous portion 254*a* of ink layer 254 and thereby forms an image on record medium 255. The current flowing through resistive layer 251 concentrates on the portion just under printing electrode 256, since the current flows into conductive layer 252 in which resistance is lower than that of resistive layer 251. As a result, a print dot having the same area can be obtained. Although this type of printing apparatus has the advantage of high speed, it is necessary to form a matrix in the same manner as the method of using a thermal head. Consequently, in spite of the above advantage, the prior art provides a very expensive printing apparatus. See also U.S. Pat. No. 3,744,611 which is also directed to an electro-thermic printing device.

SUMMARY OF THE INVENTION

Generally speaking, in accordance with the present invention, a printing apparatus for printing on a record medium is provided. The printing apparatus includes an ink sheet having an ink layer with heat-fusible ink thereon facing the record medium and a resistive layer. A print head having at least a pair of opposed electrodes is in contact with the resistive layer. A driving circuit is coupled to the pair of opposed electrodes for applying a voltage to the pair of opposed electrodes. The pair of opposed electrodes when the voltage is applied thereto causes a current to flow through the ink sheet to heat the ink layer so that the ink thereon is transferred to the record medium. A control circuit is coupled to the driving circuit which controls the voltage supplied by the driving circuit. The control circuit includes a gray scale signal generator which produces a gray scale signal and a pulse width setting circuit for modulating the pulse width of the voltage supplied by the driving circuit in response to the gray scale signal.

The print head and ink sheet may be formed so that the current flowing through the electrodes is passed through the resistive layer in a horizontal direction. The control circuit may include a color signal generator which generates three types of color signals according to the three primary colors for performing full-color printing. The pulse width setting circuit modulates the pulse width of the voltage supplied to the electrodes in response to the three types of color signals. In this manner, full-color printing may be effected on the record medium.

A method for printing by means of the printing apparatus is also provided.

Accordingly, it is an object of the present invention to provide an improved printing apparatus and method wherein heat-fusable ink on a sheet is selectively heated for transfer to a record medium.

Another object of the present invention is to provide an improved printing apparatus which utilizes an electric thermo-transfer method wherein the darkness and intensity of the image can be controlled during printing.

Yet another object of the present invention is to provide an electro-thermic printer which can print in color.

A further object of the present invention is to provide an improved printing apparatus having a high printing speed and reduced cost.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 6A and 6B are schematic views of a recording head in accordance with the present invention;

DESCRIPTION OF THE PREFERRED EMBODIMENTS

Figure 1:
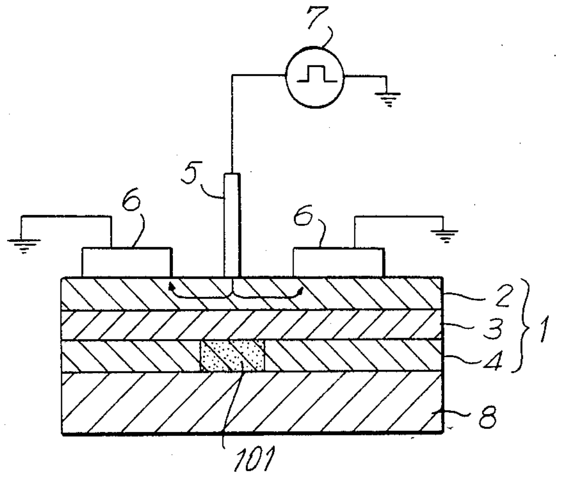
FIG. 1 is a schematic sectional view for describing the thermo-transfer method according to the present invention.
Figure 2A:
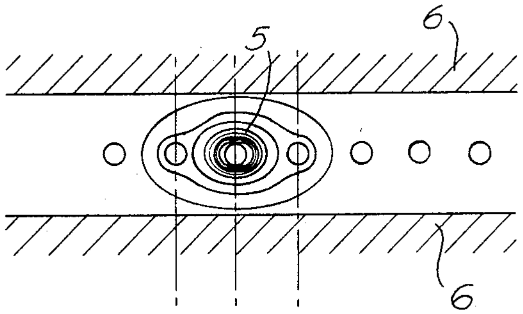
FIGS. 2A and 2B depict the potential distribution and temperature distribution, respectively, of a conductive layer of the recording head in accordance with the present invention.
Figure 2B:
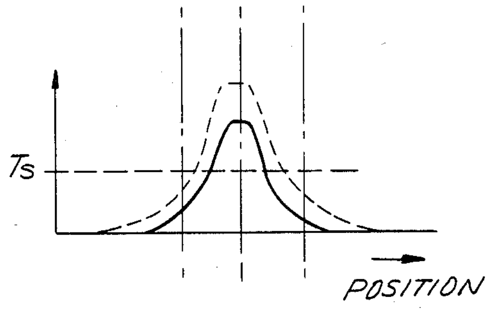

Reference is first made to FIGS. 1, 2A and 2B which illustrate fundamentals of the printing apparatus embodying the present invention. An electric thermo sheet 1 includes a resistive layer 2, a support layer 3 and a heat-fusble ink layer 4. Support layer 3 may be also used both as a support layer and a conductive layer. The principle of recording is as follows: When a voltage relative to a record pattern is applied to a recording electrode 5 in a signal voltage generating portion 7, the current flows into common electrodes 6 through resistive layer 2. In this situation, if the area of common electrodes 6 is much larger than the contact area of recording electrode 5 and resistive layer 2, the joules heat generated by the electric thermo process appears substantially just below recording electrode 5. The generated joules heat melts heat-fusable ink 4 through support layer 3 by transmitting the heat thereto. As a result, a melted portion 101 of the heat-fusable ink on layer 4 is transferred to a record medium 8, and thereby printing is effected thereon.

Upon close examination, the potential distribution in resistive layer 2 provides a very sharp potential curve in the area around recording electrode 5 as illustrated in FIG. 2A. Thus, the thermal distribution in the electric thermo sheet which is energized takes a peak-like shape having a peak in the center, as depicted in FIG. 2B. In FIG. 2B, the dotted line represents a condition where the supplied energy is larger than the condition represented by the solid line. In this graph, the vertical-axis represents temperature and the horizontal-axis represents the position corresponding to FIG. 2A. If the melting point of the heat-fusable ink is indicated as Ts, the area of the thermal distribution cut by Ts changes according to the supplied energy. Namely, the area of the potential distribution wherein the solid ink can be melted varies in response to the supplied energy, and therby the area of printed dots is modulated.

Figure 3:
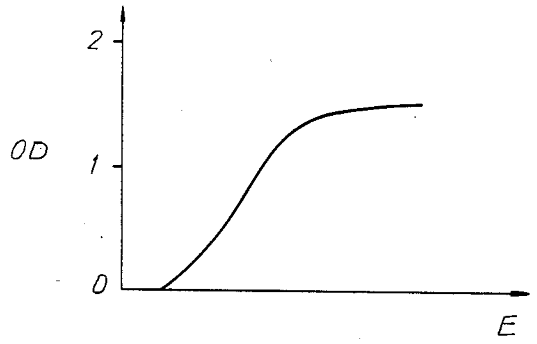
FIG. 3 is a graph depicting the relationship between the applied energy and printing density.

FIG. 3 shows the relationship between the printing energy and the optical density (OD). As the area of each dot is modulated respectively, there is no need to construct the dots in a matrix, which results in a great advantage such that the cost can be reduced and the speed increased.

According to the present invention, the pulse width of the applied voltage is varied to modulate the supplied energy.

Figure 4:
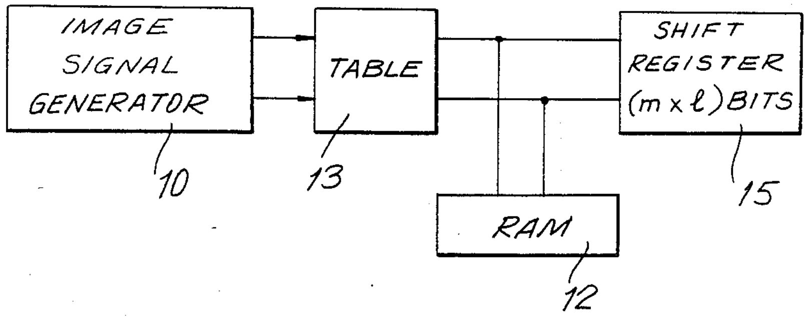
FIGS. 4 and 5A are block circuit diagrams of a pulse width modulator utilized in the printing apparatus of the present invention.
Figure 5A:
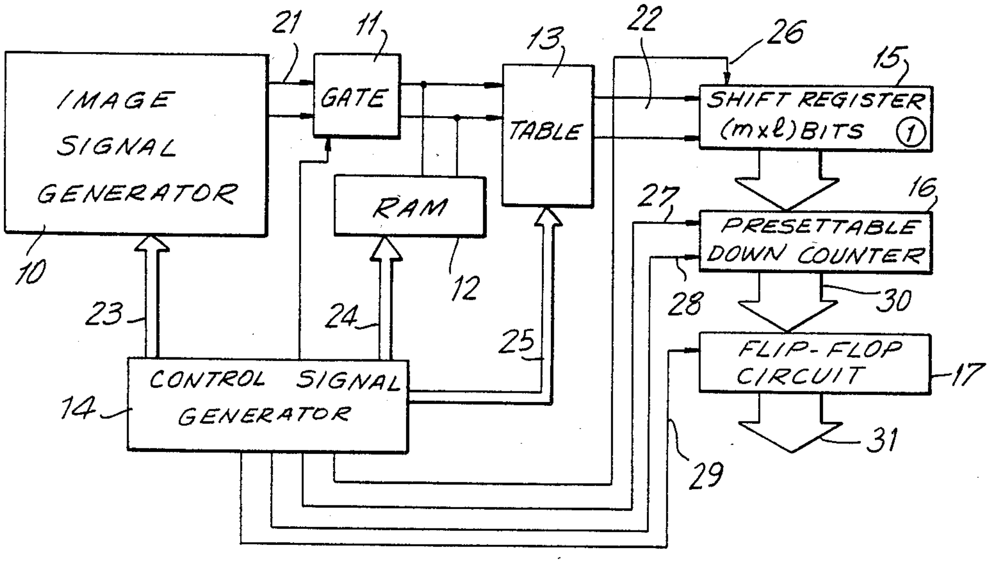

FIGS. 4 and 5A depict the basic structure of a pulse width modulator. An image data signal 21 is delivered from an image signal generating portion 10 by a request signal 23. Image data signal 21 of n bits per picture element is stored in a RAM memory 12 through a tri-state gate 11. "1" pieces of the stored data is read out again, converted by a gamma converting table 13 to a data of m bits which is suitable for the printing characteristic, and then transmitted to (m×1) bits of a shift resistor 15. At this time, it may be possible to make the value "m" equal to "n," but the value of "m" is dependent on the capability of transferring a gray scale of a printing apparatus. In the construction as shown in FIG. 4, the memory can be economized by being provided $n>m$.

Figure 5B:
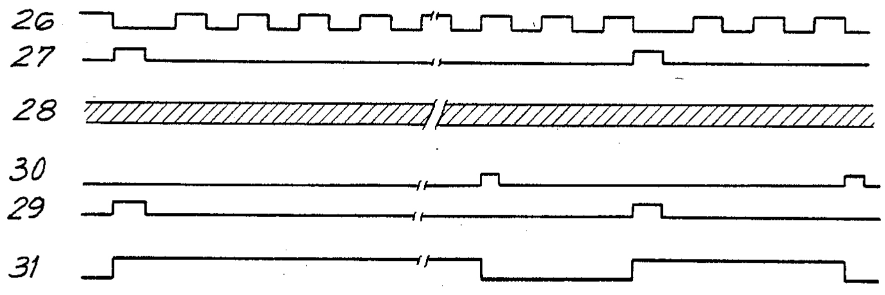
FIG. 5B depicts the timing charts associated with the operation of the circuit depiced in FIG. 5A.

"1" pieces of m bits data transmitted from shift resistor 15 is latched by a counter 16 in response to a signal 27. A carry signal 30 corresponding to each data is generated in "1" pieces of counter 16 of m bits in response to a clock signal 28. "1" bit of a flip-flop 17 is respectively set or reset in response to a set signal 29 or the carry signal 30 to obtain "1" pieces of a pulse width signal 31 with every data. Meanwhile, the next "1" pieces of data is transmitted to shift register 15. FIG. 5B illustrates the timing charts associated with operation of the circuit of FIG. 5A. Referring to FIG. 5A, reference number 24 shows address signals and control signals for RAM memory 12, and 25 shows those for gamma converting table 13.

Figure 7A:
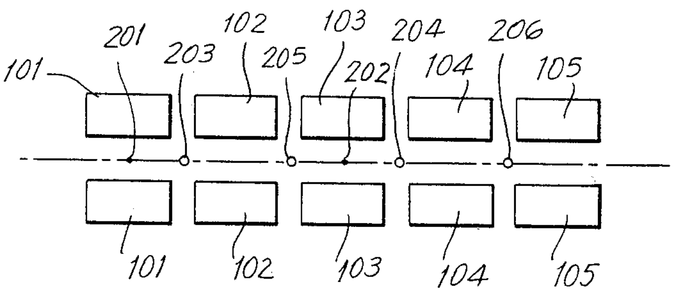
FIGS. 7A and 7B are schematic views of the electrode configuration for use in the print head in accordance with the present invention.
Figure 7B:
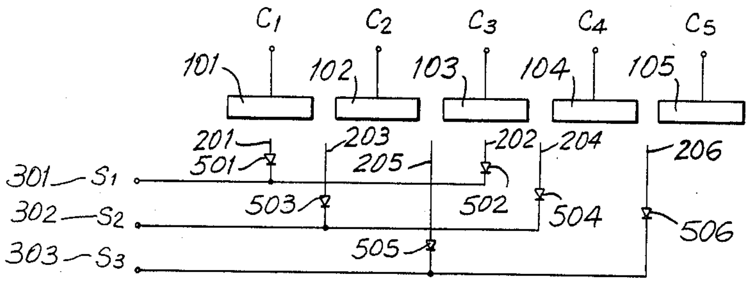

FIGS. 6A and 6B illustrate a schematic view of a recording head. Five hundred (500) pieces of recording electrodes 201 are interposed between twenty-one (21) pairs of common electrodes 101 to 121 which are oppositely disposed. FIGS. 7A and 7B illustrate fundamentals of driving a recording head dynamically in accordance with the invention. As shown in FIG. 7A, recording electrodes 201 to 206 are arranged between plural pairs of return electrodes 101 to 105 which are disposed oppositely. A pair of return electrodes are hereinafter to be referred to as a return electrode.

Figure 8:
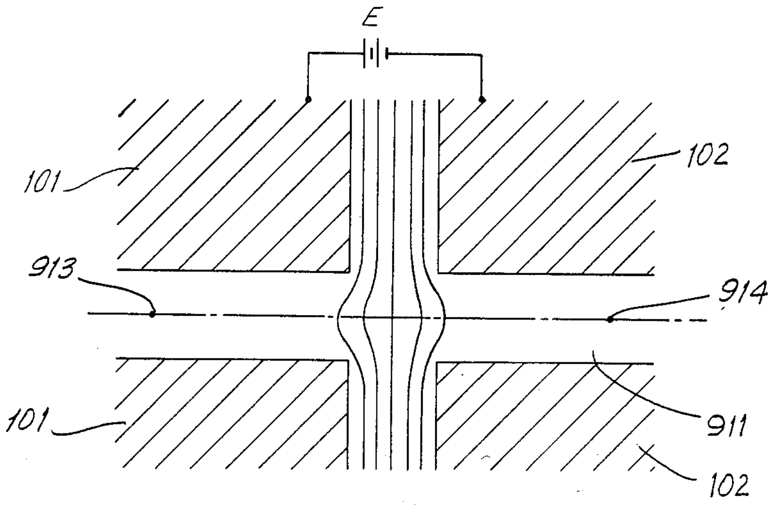
FIG. 8 depicts the potential distribution of a conductive layer caused by the return electrodes in the print head of the present invention.

FIG. 8 illustrates an equipotential surface in a resistive layer when applying different potentials to neighboring return electrodes. Therein, the recording head is in contact with an electric thermo sheet having the conductive layer, and E(v) and O(v) potential are respectively provided to the return electrodes 101 and 102. As illustrated in FIG. 8, the electric field is not provided in the region 911 between a pair of return electrodes 102. Therefore, for example, when O(v) potential is simultaneously applied to recording electrodes 913 and 914, current flows from the recording electrode 913 to the return electrode 101, while it does not flow into the area around the recording electrode 914 due to the same potential. In this case, printing is performed with recording electrode 913 in accordance with the above principle of the electric thermo recording, but not with the recording electrode 914. Such an arrangement of the return electrode of this invention permits the potential of the return electrode and the recording electrode to be selected, which results in a selective printing.

FIG. 7B illustrates an operating principle according to the invention. Selective signal electrodes S1 301, S2 302, S3 303 are respectively connected to recording electrodes 201 to 206 through anti-reversible diodes 501 to 506. For instance, the selective signal electrode S1 301 was selected to be applied O(v), the selective signal electrodes S2 302 and S3 303 are non-selected to be floated, and O(v) or E(v) is simultaneously and independently applied to the return electrodes 101 and 103. No matter how potential is respectively applied to each return electrode, the electric field is not formed between a pair of opposed return electrodes as mentioned above. Therefore, the printing can be independently effected with recording electrodes 201 and 202. On the other hand, although a closed loop is respectively provided between the non-selected recording electrodes 203, 204, 205, 206 and the return electrodes 101, the current is prevented from flowing by the anti-reversible diodes 503, 504, 505, 506. Therefore, the printing is not effected. In the case of selecting the selective signal electrodes 302 and 303, the recording electrodes 203, 204, or 205, 206 are respectively disposed between the return electrodes 101 and 102, 103 and 104, or 102 and 103, 104 and 105 as shown in FIG. 7B, so that the recording electrodes are influenced by the adjacent return electrodes.

In order to avoid this influence, the neighboring electrodes are driven in pairs. For example, when selecting the selective signal electrode 302, two pairs of return electrodes 101 and 102, 103 and 104 are energized. When selecting the selective signal electrode 303, two pairs of return electrodes 102 and 103, 104 and 105 are energized. In this way, all the recording electrodes can be driven. Actually,. one sub-scanning period is separated into the first half and the latter half. Therefore, the return electrodes such as 101 and 102, 103 and 104 are driven in pairs in the first half and such as 102 and 103, 104 and 105 are driven in the latter half.

When the different level of potentials are applied to a pair of return electrodes, respectively, the current flows among the return electrodes. However, it does not interfere with the operation since the current density of return electrodes whose area is sufficiently larger than that of recording electrode is very small.

In order to print a line of characters or image, such an irregular dynamic driving system as described below is used for driving a different pair of adjacent return electrodes between the first half and the latter half period. Namely, when M pieces of selective signal electrodes and (2N+1) pieces of return electrodes are utilized, M+(2N+1) pieces of driving circuits can drive M×N pieces of recording electrodes. At this time, image or characters are written by using N pieces of recording electrodes at the same time during one selective period, and the duty is 1/M. Assuming the same speed applied to the conventional multi-head method, the selective period of the invention is N times greater than that of the conventional multi-head method. Thus, electric power can be greatly reduced. Further, manufacturing cost can be also reduced by decreasing the number of driving circuits.

The shape of the above-mentioned electrodes in accordance with the invention is similar to that of the conventional static electric printer having a multi-stilus. The conventional multi-stilus static electric printer cannot realize the dynamic driving in the electric thermo transfer method, but the driving method of the invention can realize it. Such a driving method will be described by the following.

Figure 9:
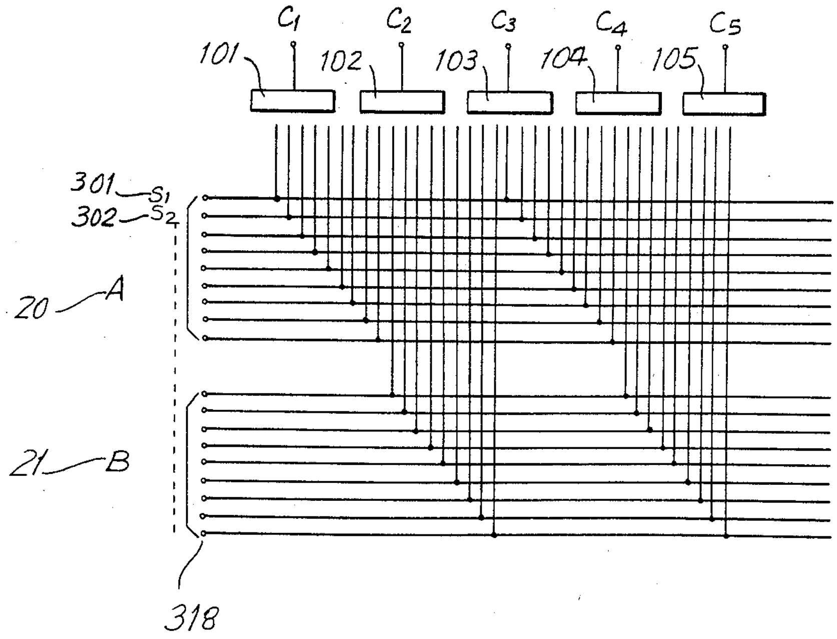
FIG. 9 PRIOR ART
FIG. 9 is a diagrammatic view depicting the electrode configuration for driving a multi-stilus static electric printer in accordance with the prior art.

FIG. 9 illustrates a conventional multi-stilus static electric printer where the selective signal is fed to the equivalent return electrodes C1 101 through C5 105, and the recording electrodes are divided into A group 20 and B group 21 which are alternately driven.

Figure 10:
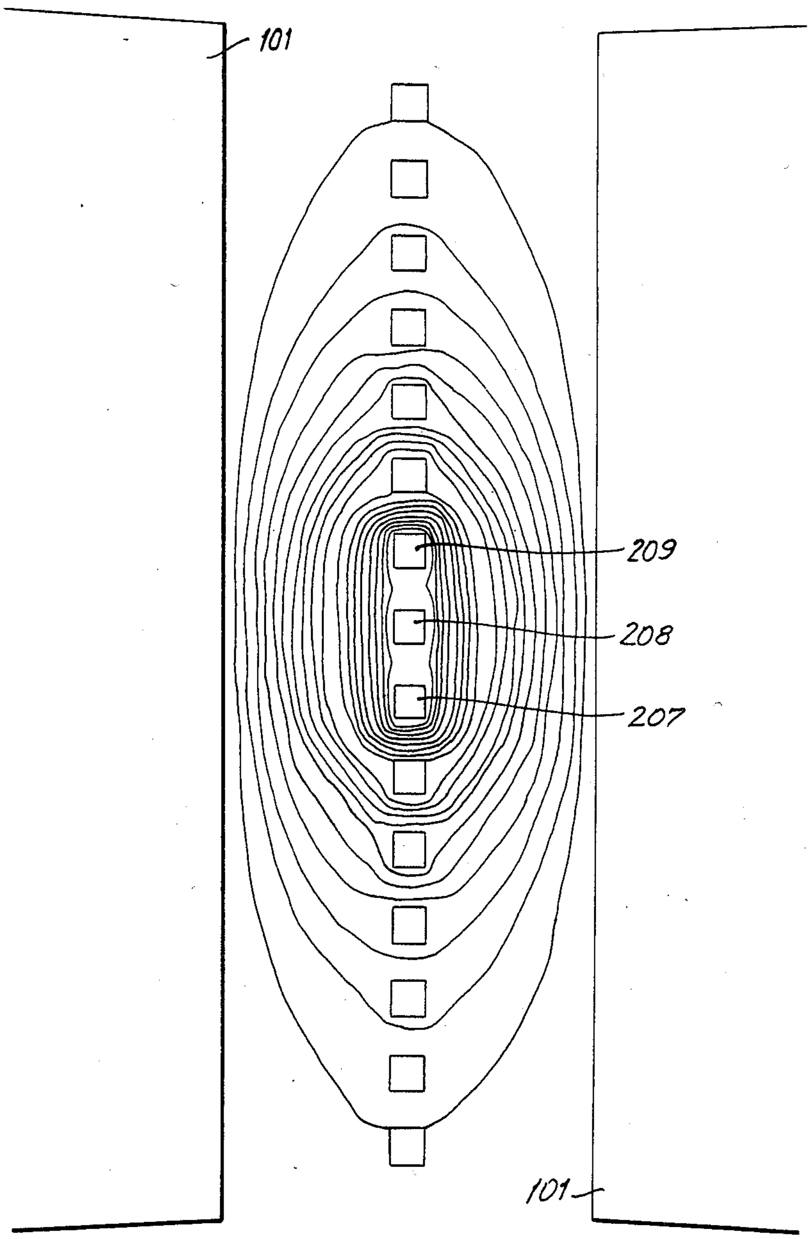
FIG. 10 PRIOR ART
FIG. 10 depicts the potential distribution of a conductive layer in utilizing the driving method of a multi-stilus static electric printer.

FIG. 10 illustrates the distribution of potential created in the resistive layer when such a driving method is applied to an electric thermo transfer method. As an example, opposed return electrodes 101 are set to E(v), adjacent recording electrodes 207, 208 and 209 are set to O(v) and other recording electrodes are in the floating state. In this case, the current density decreases compared with the case that only one recording electrode is set to O(v), since potential grade is not created among respective recording electrodes of O(v). In particular, little current flows into the center recording electrode 208. As a result, variation in print density or void in printing is caused.

In accordance with the driving method of the invention, sèlective signal electrodes 301 through 318 (FIG. 6B) are selected, and the signal voltage corresponding to data is simulataneously applied to the return electrodes 101 through 105. Thereby only one recording electrode is selected for a pair of return electrodes. As a result, the above-mentioned void in the electric field is not caused among the recording electrodes. As described above, the invention is based on the driving principle which is quite different from that of multi-stilus static electric printer.

In FIG. 6A, l1=4.4 mm, l2×0.6 mm, l3×1 mm and pitch between recording electrodes P2 ®μm. FIG. 6B is a schematic view of the driving method. Therein M=50 and N=10 for dynamic driving, and the recording electrodes N×M=500 are driven by using 50 pieces of selective signal electrodes S1 301 through S50 350 and 2N+1=21 pieces of return electrodes 101 through 121. The recording electrodes having a density of 5 dots/mm are arranged 10 cm in width between the center portions of return electrodes 101 and 121. Therefore, as stated above, when the selective signal electrodes 301 through 325 are selected, the return electrodes are driven in combinations of 101 and 102, 103 and 104,—119 and 120, respectively. When the selective signal electrodes 326 through 350 are selected, the return electrodes are driven in combinations of 102 and 103, 104 and 105,—120 and 121, respectively. Normal printing can be carried out according to the above-mentioned driving method even when the recording electrodes disposed between adjacent return electrodes are used.

Figure 11:
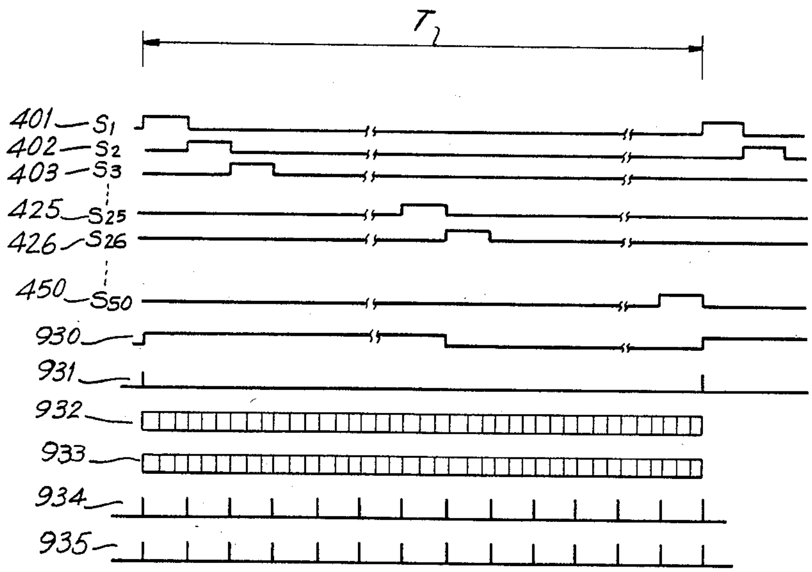
FIG. 11 is a timing chart depicting signals utilized for driving a record head in accordance with the present invention.

FIG. 11 illustrates a timing chart of a driving waveform. The selective signals 401 through 450 are fed to the selective signal electrodes 301 through 350. A potential of High level is set to O(v), and the potential of Low level is in the floating state as shown in FIG. 11. For example, in case of High level at timing of signal 930, the signals corresponding to the written data are fed by driving the return electrodes in combinations of 101 and 102, 103 and 104,—119 and 120. In case of Low level of signal 930, the signals corresponding to the written data are fed by driving the return electrodes in combinations of 102 and 103, 104 and 105—120 and 121.

In this embodiment, 16 steps of gray scales can be realized by modulating the pulse width of voltage applied to the return electrodes 101 through 121 to 16 steps.

Figure 12:
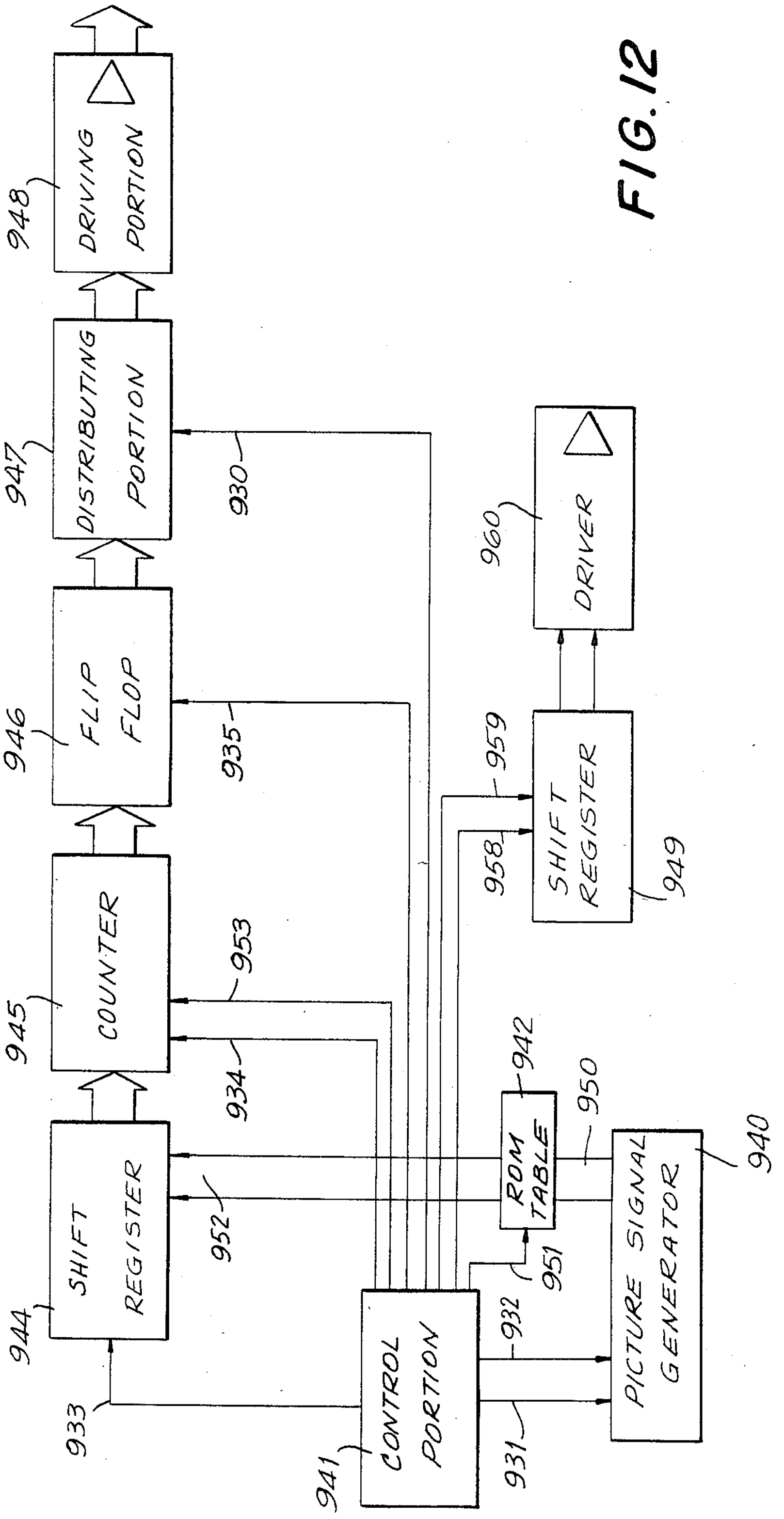
FIG. 12 is a block circuit diagram of the control circuit for driving the print head in accordance with the present invention.

FIG. 12 shows a block diagram according to an embodiment of this invention. A control portion 941 delivers a line starting signal (LS) 931 and a request clock 932 (500 pvls) into a picture signal generating portion 940. Being synchronized with request clock signal 932, a picture element data signal 950 is inputted to the address of ROM table 942 which is for treating image picture such as a gamma curve compensation. The table for treating image picture corresponding to each color and each output content is selected by a signal 951 of plural bit outputted from control portion 941. A picture element data signal 952 of 8 bits is transmitted by force of a clock signal 933 for transmission to a shift resistor 944 wherein ten resistors FF of 8 bit are connected in a line. Then, a preset counter 945 is set by a signal 934. The preset counter 945 includes ten counters of 8 bits input and reforms the pulse width corresponding to the inputted data by counting a signal by a clock signal 953. A Flip-Flop 946 is set by the carry provided from preset counter 945 with setting signal 935 and delivers a pulse corresponding to the inputted data. The pulse width is modulated by the above mentioned system. Thus, selection for 256 gray scales is permitted, though there are actually 16 gray scales caused by a signal of 4 bits. The modulated pulse selects a couple of two adjacent return electrodes among the return electrodes 101 to 121 by the signal 930 in a distributing portion 947 and then is inverted to the driving voltage in the driving portion 948 to be inputted to 21 pieces of return electrodes 101 to 121.

Selecting signals 401 to 450 are generated by a clock signal 958 and a timing signal 959 through a shift resister 949 of 50 steps. Then, the selecting signals are outputted to the selecting signal electrode 301 to 350 through an open-drain high voltage driver 960.

Figure 13:
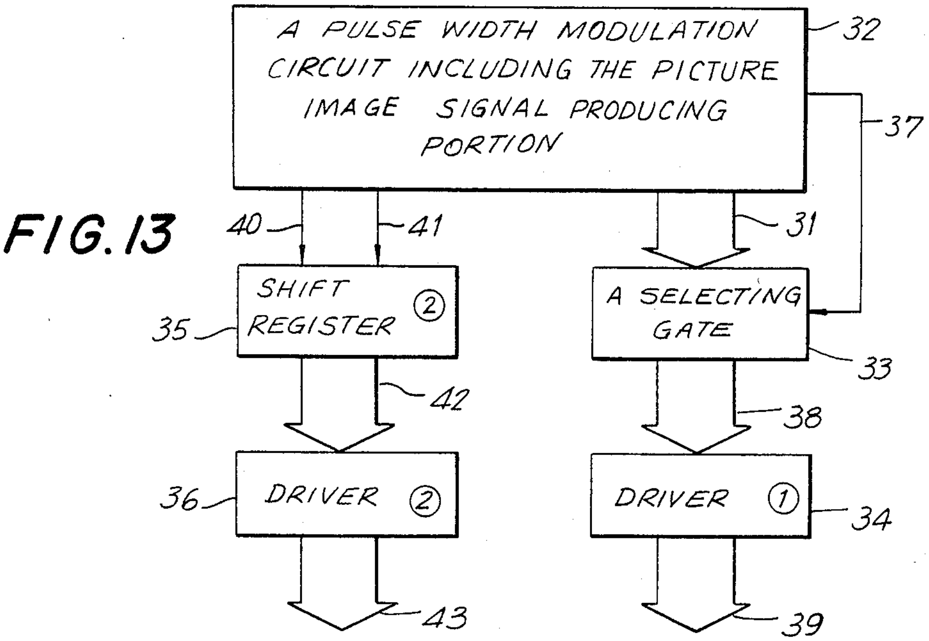
FIG. 13 depicts a driving circuit for driving a record head according to the present invention.

FIG. 13 illustrates a driving circuit wherein a block 32 is a pulse width modulation circuit including the picture image signal producing portion shown in FIG. 5A.

Figure 14:
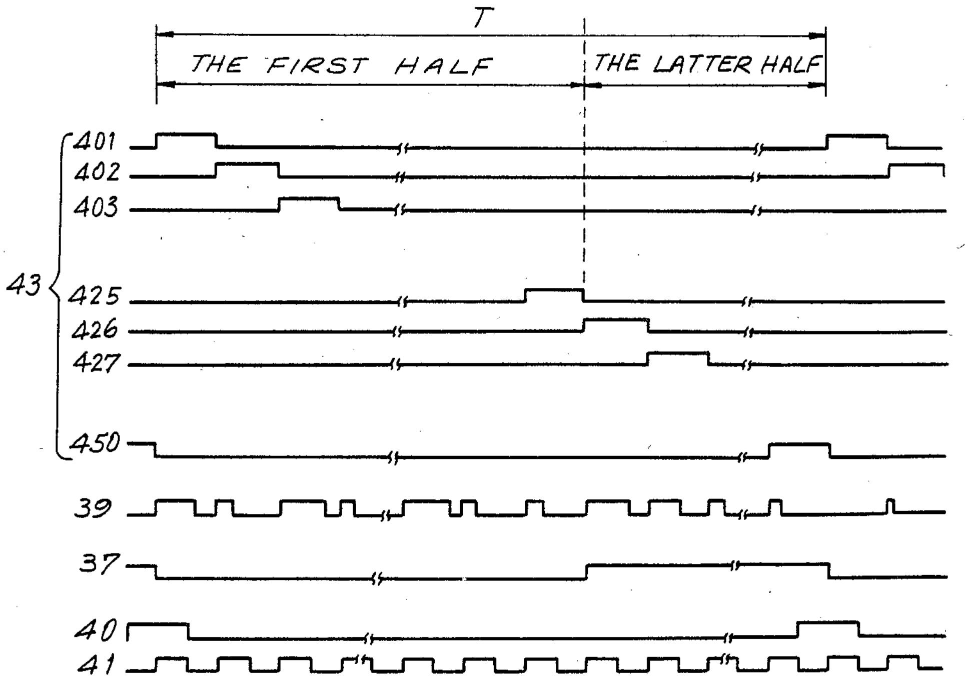
FIG. 14 is a timing chart for signals utilized in connection with FIG. 13.

FIG. 14 shows timing charts of signals of FIG. 13. In the case of this embodiment, data of 6 bits per one element is stored in memory 12 of 500 words per one line. Every ten data are read out during the period of 1/50 duty, and are modulated to the data of 5 bits per one element in a gamma modulation table and applied to a shift resistor ① 15 (FIG. 5A) of 5 bits by ten steps in parallel so as to be modulated to the pulse width as described above. Ten pieces of signals 31 which are modulated to the pulse width are divided into twenty-one pieces of signals 38 through a selecting gate 33, and subsequently are divided into twenty-one common electrodes through a driver ① 34.

Figure 15:
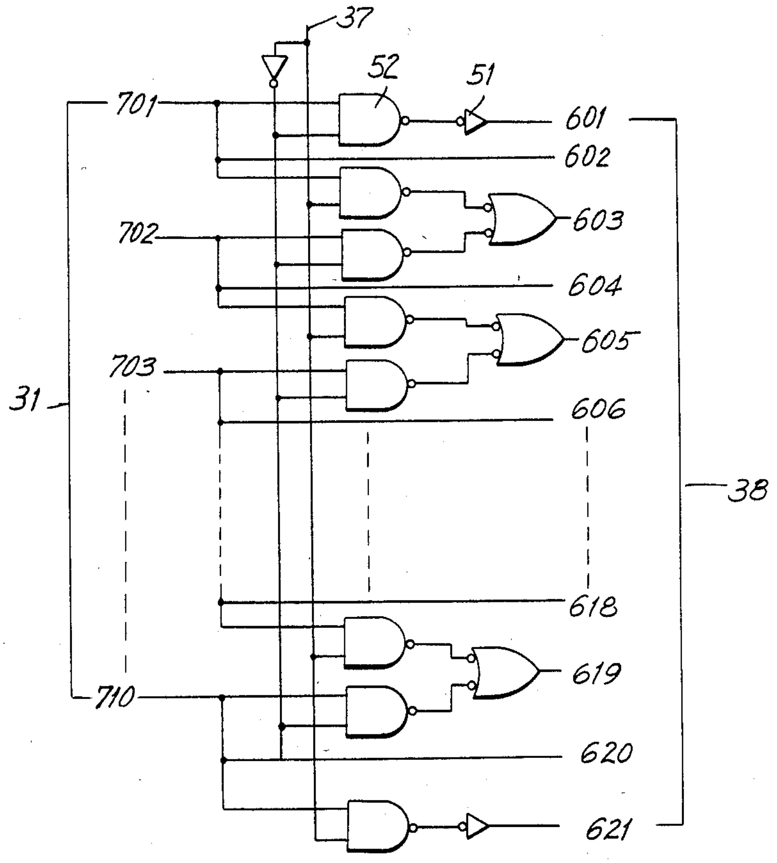
FIG. 15 is a circuit diagram of the selecting gates in accordance with an embodiment of the present invention.
Figure 16:
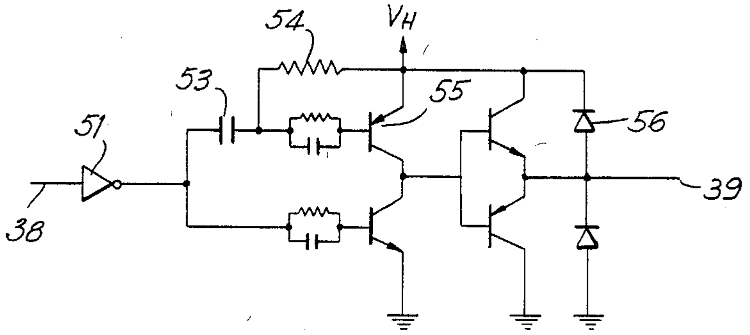
FIGS. 16 and 17 are circuit diagrams of drivers utilized in the present invention.

An example of the selecting gate 33 is illustrated in FIG. 15, and an example of the driver ① 34 is illustrated in FIG. 16, wherein inverter 51, NAND gate 52, condenser 53, resister 54, transistor 55 and diode 56 are shown.

The signals 601 to 621 from the selecting gate 33 are respectively applied to the common electrodes 101 to 121 through the driver ① 34. For example, when the selective signal 37 is Low level during the first half of period, the signals 701 to 710 which are respectively modulated are applied to pairs of signals 601 and 602, 603 and 604,—619 and 620.

In the driver ① 34, the signal 38 of 5 V from selecting gate 33 is level-modulated to VH=40 V through a first pair of complimentary transistors, and subsequently is current-amplified through a latter pair of emitter-follower transistors.

Figure 17:
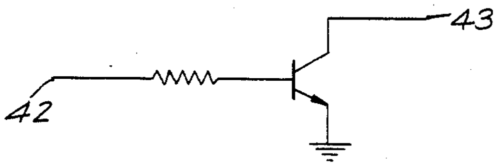

The control signals 40 and 41 are applied to shift resistor ② 35 so as to form the selecting signal 42 of 1/50 duty, and then are divided into the selective signal electrodes 301 to 350 through the driver ② 36. FIG. 17 illustrates an example of the driver ②, which is a switching cirucit. Therein the circuit turns ON when the signals 401 to 450 are High level, and the current flows from the common electrodes.

In order to effect the full-color printing, according to this invention, a heat fusable ink is transferred on the record medium from yellow and magenta to cyan in order on every page.

For a source of input signal, there is a possibility to use a television signal, a full-color scanner, a personal computer and the like. Among them, NTSC television signal of stopping picture is utilized for the input source in the embodiment of this invention.

Figure 18:
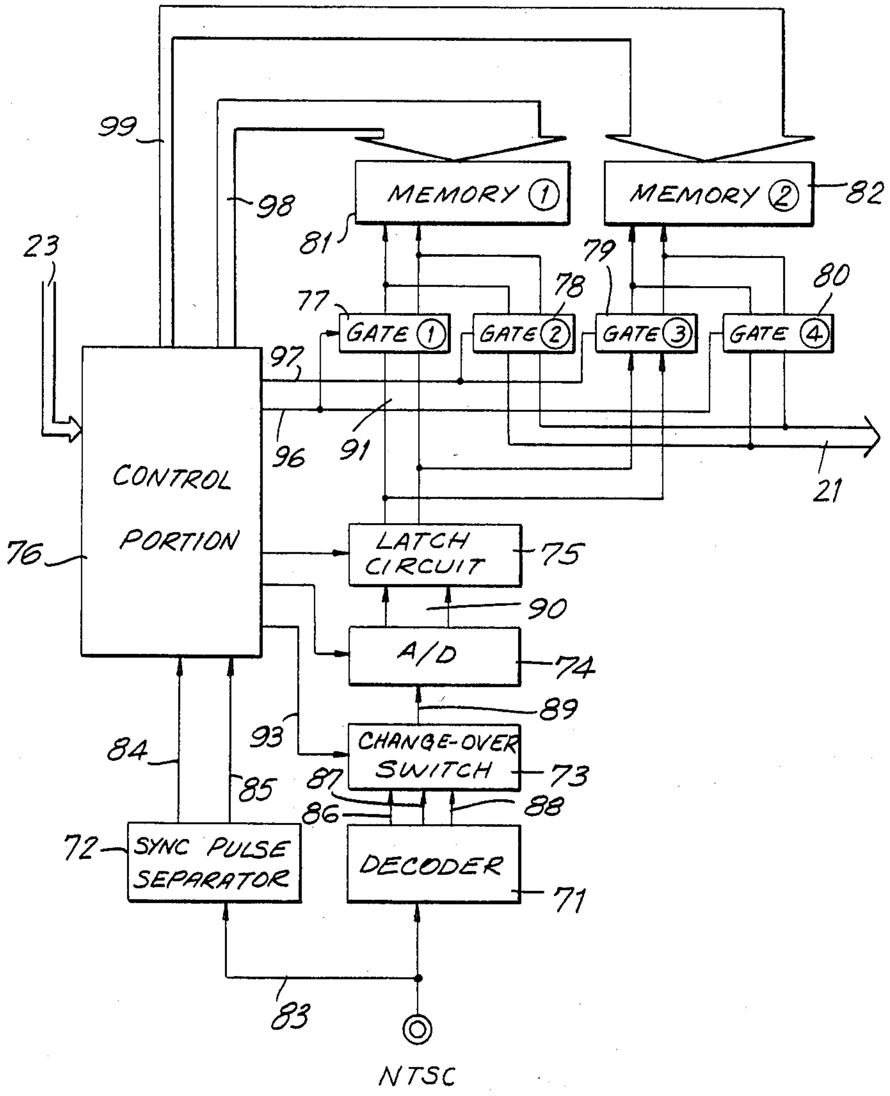
FIG. 18 is a block circuit diagram of an image signal generating circuit in accordance with the present invention.

FIG. 18 is a block diagram of a picture signal generating portion. A NTSC composit signal 83 is decomposed into red signal R86, green signal G87 and blue signal B88 through a decoder 71 and inputted to a change-over switch 73. The signals B88, G87 and R86 are switched over in order at every page by the change-over switch 73 with a change-over signal 93, so that the full-color printing is effected in order from yellow, magenta to cyan at every page. The printing speed during a line is made 60 Hz. One horizontal signal is converted from analog to digital per one field of television signal to produce a data signal 90 of 6 bits. After passed through a latch circuit 75, the latched signal is alternately stored to a memory 81 and a memory 82. Thus, the number of memories can be reduced. When data is written in memory 81, another data is read from a memory 82. Therefore, the data 21 is supplied to a pulse width modulator without loss in time by alternately driving two line memories. These operations are controlled by a horizontal synchronizing signal 84 and a vertical synchronizing signal 85 delivered from a sync pulse separator 72, control signals 96 and 97 for controlling Write gates 1 & 3 and Read gates 2 & 4 generated in a control portion 76 by a request signal 23 from the pulse width modulator, and memory control signals 98 & 99. Decoder 71, change-over switch 73, A/D converter 74, latch circuit 75, sync pulse separator 72 and control portion 76 correspond to the image signal generating portion 10 in FIG. 5A. Memory 1 and Memory 2 correspond to RAM memory 12 in FIG. 5A. Data 21 is inputted to the gamma compensation table 13 in FIG. 5A.

Figure 19:
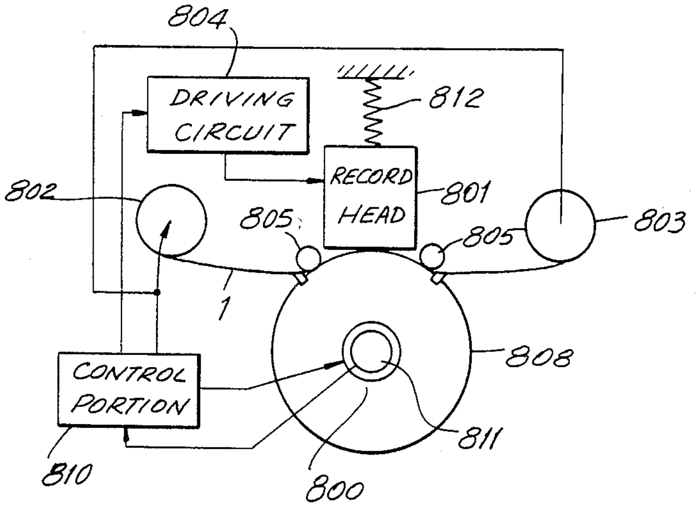
FIG. 19 is a diagrammatic view of a printing apparatus constructed in accordance with the present invention.

FIG. 19 illustrates the basic concept of a full color printer according to this invention. A record medium 808 is wound onto a roller 800. An electric thermo sheet 1 is supplied from the supply reel 802 through the transfer reel 805. The electric thermo sheet is piled with the record medium on the roller 800 and recorded by a record head 801. The record head is pressed against the roller by a spring 812 in order to keep the pressure therebetween. As a result, the electric thermo sheet is allowed to be kept in uniform contact with the record medium.

Figure 20:
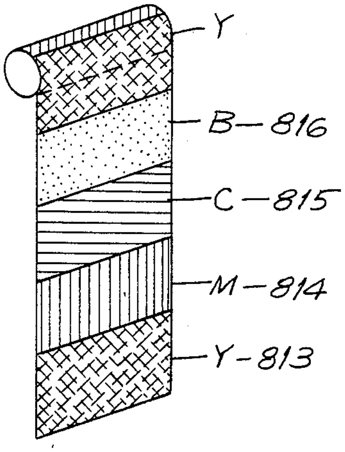
FIG. 20 is a perspective view of an electric thermo sheet utilized in the printing apparatus of the present invention.

Referring to FIG. 20, the electric thermo sheet is in a roll. The heat fusable ink of yellow 813, magenta 814, cyan 815 and black 816 are transferred on the record medium for every page. Therefore, four times recording is necessary for obtaining one sheet of full color record. When one color ink is placed over another, the position of the recording medium must be placed very precisely. Blank ink layer 816 is not always required, since the black is formed by mixing each ink of yellow 813, magenta 814, and cyan 815 in equivalence. In the present invention, record medium 808 is wound and fixed on roller 800. A rotary encoder 811 decides the absolute position of the record medium. The positioning signal is delivered from the rotary encoder 811 to the control portion 810. One signal from the control portion 810 is fed back to roller 800 for maintaining a rotation of constant speed. One signal is delivered to a reel 802 for supplying a sheet. One signal is delivered to a take-up reel 803. One signal is delivered to the record head driving circuit 804. Thus, the record medium is very precisely positioned. The positioning signal delivered from rotary encoder 811 is inputted to the control portion 76 in FIG. 18 and synchronized with the change-over signal 93. The sheet transfer signal is supplied from control portion 76 in FIG. 18 to the control portion 810 for driving a rotor synchronously with the change-over signal.

In the embodiment, a full color printing of 32 gray scales on stopping television picture can be effected in 30 seconds by printing heat fusable ink of yellow, magenta and cyan on a record medium in pile under the applied voltage 40 V.

Figure 21A:
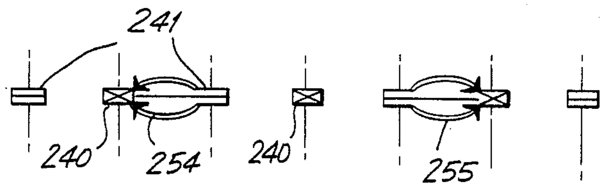
FIGS. 21A and 21B are circuit diagrams for use in explaining alternative embodiments of the present invention.
Figure 21B:
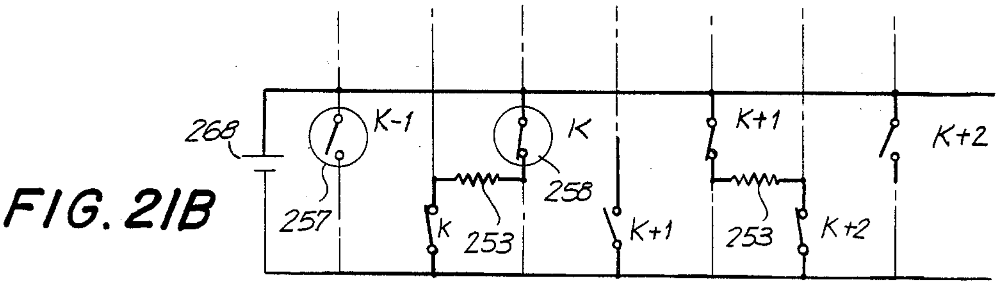

In the above-mentioned embodiment, recording electrodes of the pin type and return electrode of the plane type are utilized, but it is clear that the invention is applicable to other embodiments as shown in FIGS. 21A and 21B. In FIGS. 21A amd 21B, the voltage is applied between the electrodes of the pin type. The contacting end portions of the electrode of pin type with the resistive layer are indicated by 240 and 241. Contact of electrodes with the power supply 268 are controlled by switches $(k-1)$ to $(k+2)$.

The arrows in FIG. 21A represent the direction of the current flow. FIG. 21B shows the equivalent circuit thereof. An open switch is indicated by 257 and a closed switch is indicated by 258. Under this condition, a current flows as indicated 254 and 255. Each electrode is selected and controlled by the switches $(k-1)$ to $(k+2)$. Printing in parallel, like the hereinbefore mentioned embodiment, can be possible by dynamic driving.

Figure 22:
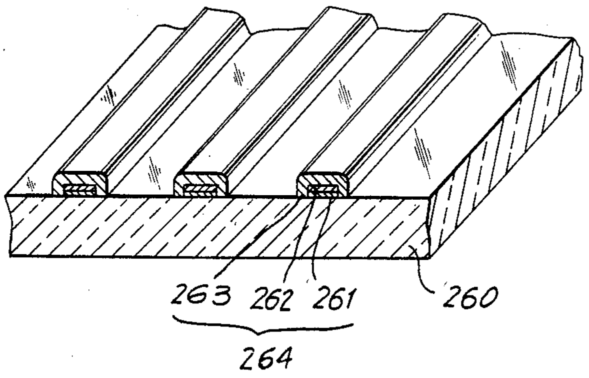
FIG. 22 is a perspective view of a print head utilized in conjunction with FIGS. 21A and 21B.
Figure 23A:
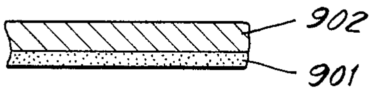
FIGS. 23A, 23B, and 23C are sectional views of ink sheets according to alternative embodiments of the present invention.
Figure 23B:
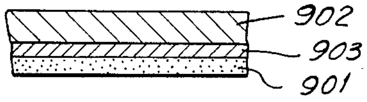
Figure 23C:
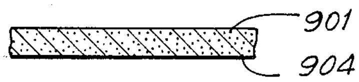
Figure 24:
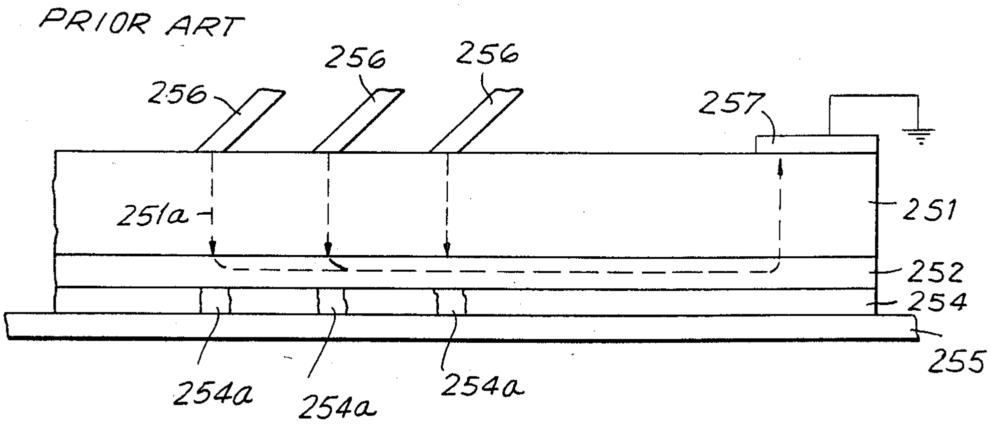
FIG. 24 PRIOR ART
FIG. 24 is a sectional view of a prior art printing apparatus utilizing the electric thermo-transfer method.

FIG. 22 illustrates one example of a head construction utilizing the electrodes of the pin type 264. Ni-Cr layer 261 and Cu layer 262 are deposited on the ceramic substrate 260 and etched photo chemically to form electrodes. Then Ni-W-P layer 263 is selectively coated on the electrodes by the electrolysis plating. The ink sheet used in the first embodiment consists of the ink layer disposed on one surface of the insulating supporting layer and the resistive layer disposed on another surface thereof. In this embodiment, the ink sheet is shown in FIGS. 23A, 23B and 23C. In FIG. 23A, the ink layer 901 is directly supported by the resistive layer 902. In FIG. 23B, the insulating layer 903 is interposed between ink layer 901 and resistive layer 902 for preventing the muddy color problem. FIG. 23C illustrates a single layer sheet wherein the resistive layer is included into the ink layer in a body. The resisitive layer is formed by binding carbon particles with resin and coating in layer. The resistant value is desirable to be 100 to 100 KΩ.

As above mentioned, this invention can provide a fullcolor gray scale printing apparatus by modulating a pulse width with high reliability. In particular, the feature of this invention is that the printing apparatus of electric thermo transfer method is so constructed that the current flowing between two electrodes connected with the resistive layer flows in the resistive layer with ink sheet containing at least the resistive layer and the ink layer. The effect of this invention is that the sufficient gray scale display is obtained, even though the number of electrodes is reduced, by using the means which varies the pulse width of the applied voltage according to the gray scale command signal. In addition, rapid gray scale printing is achieved.

In an embodiment described herein, NTSC television signal of stopping picture has been utilized, but is is clear that the invention is applicable to other input sources, such as a full color printer, a full color copier, full color television printer or the like. Application of this invention is thus extensive with very beneficial effects.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printing apparatus for printing on a record medium comprising an ink sheet having an ink layer with heat-fusable ink thereon facing said record medium and a resistive layer, a print head having at least a pair of opposed electrodes in contact with said resistive layer, driving circuit means coupled to said pair of opposed electrodes for applying a voltage to said pair of opposed electrodes, said pair of opposed electrodes when said voltage is applied thereto causing a current to flow through said ink sheet to heat said ink layer so that said ink thereon is transferred to said record medium, control means coupled to said driving circuit means for controlling the voltage applied by said driving circuit means, said control means including a gray scale signal generating means for producing a gray scale signal and a pulse width setting means for modulating the pulse width of the voltage applied by said driving circuit means in response to said gray scale signal.

2. The printing apparatus as claimed in claim 1, wherein said print head and said ink sheet are formed so that the current flowing through said electrodes is passed through said resistive layer in a horizontal direction.

3. The printing apparatus as claimed in claim 1, wherein said ink sheet includes an insulating support layer disposed intermediate said resistive layer and said ink layer.

4. The printing apparatus as claimed in claim 1, wherein said ink sheet is formed of two layers including said resistive layer and said ink layer.

5. The printing apparatus as claimed in claim 1, wherein said ink sheet member include said resistive layer and said ink layer which are formed as one layer.

6. The printing apparatus as claimed in claim 1, further comprising a plurality of pairs of said opposed electrodes to which said voltage is selectively applied, said pairs of opposed electrodes being arranged in a line with each pair of opposed electrodes being driven by time sharing.

7. The printing apparatus as claimed in claim 1, wherein one electrode in said pair of opposed electrodes has the shape of a pin and the other electrode in said pair of opposed electrodes is planar.

8. The printing apparatus as claimed in claim 1, wherein both of said electrodes in said pair of opposed electrodes are pin-shaped electrodes.

9. A printing apparatus for printing on a record medium comprising an ink sheet having a plurality of ink colors thereon facing said record medium and a resistive layer, a print head having at least a pair of opposed electrodes in contact with said resistive layer, driving circuit means coupled to said pair of opposed electrodes for applying a voltage to said pair of opposed electrodes, said pair of opposed electrodes when said voltage is applied thereto causing a current to flow through said ink sheet to selectively heat said ink layer so that said ink colors thereon can be selectively transferred to said record medium, control means coupled to said driving circuit means for generating a printing signal to control the voltage applied by said driving circuit means, said control means including a color signal generating means for generating three types of color signals according to the three primary colors for performing full-color printing and a pulse width setting means for modulating the pulse width of the voltage applied to said pair of opposed electrodes in response to said three types of color signals, said print head and said ink sheet member being formed so that the current flowing through said pair of opposed electrodes passes through said resistive layer in a horizontal direction, the desired color of ink being moved in position with respect to said pair of opposed electrodes in response to said three types of color signals so that proper color printing can be effected on said record medium.

10. The printing apparatus as claimed in claim 9, wherein said ink sheet is formed of a belt-shaped sheet with a plurality of ink colors arranged in sequence in the longitudinal direction of said belt-shaped sheet.

11. The printing apparatus as claimed in claim 9, further comprising detection means for detecting the relative position of said ink sheet and said print head to permit the proper color of ink to be positioned adjacent said electrodes for printing on said record medium.

12. The printing apparatus as claimed in claim 9, wherein said ink sheet includes an insulating support layer disposed intermediate said resistive layer and said ink layer.

13. The printing apparatus as claimed in claim 9, wherein said ink sheet includes a double layer of said resistive layer and said ink layer.

14. The printing apparatus as claimed in claim 9, wherein said ink sheet includes said resistive layer and said ink layer which are formed as one layer.

15. The printing apparatus as claimed in claim 9, further comprising a plurality of pairs of said opposed electrodes to which said voltage is applied, said plurality of pairs of opposed electrodes being arranged in a line with each pair of said opposed electrodes being driven by time sharing.

16. The printing apparatus as claimed in claim 9, wherein one of said electrodes in said pair of opposed electrodes has the shape of a pin with the other of said electrodes having a planar surface.

17. The printing apparatus as claimed in claim 9, wherein both of said electrodes in said pair of opposed electrodes are pin-shaped electrodes.

18. The printing apparatus as claimed in claim 9, wherein said ink layer includes the three colors of yellow, magenta, and cyan.

19. The printing apparatus as claimed in claim 9, wherein said ink layer includes the four colors of yellow, magenta, cyan, and black.

20. A method of effecting printing on a record medium, comprising the steps of:

positioning an ink sheet having an ink layer with heat fusable ink thereon against said record medium;

positioning a print head having at least a pair of opposed electrodes adjacent said ink sheet;

applying a voltage to said pair of opposed electrodes to cause a current to flow through said ink sheet to heat said ink layer;

and modulating the pulse width of the voltage applied to said pair of opposed electrodes to control the position and amount of ink heated and transferred to said record medium.

* * * * *